(12) United States Patent
Feick et al.

(10) Patent No.: US 7,462,031 B2
(45) Date of Patent: Dec. 9, 2008

(54) INJECTION MOLDING NOZZLE WITH RECESSED TERMINAL

(75) Inventors: Murray Feick, Kitchener (CA);
Payman Tabassi, Rockwood (CA);
Glenn Sterritt, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 589 days.

(21) Appl. No.: 11/286,479

(22) Filed: Nov. 25, 2005

(65) Prior Publication Data
US 2007/0119990 A1   May 31, 2007

(51) Int. Cl.
*B29C 45/20* (2006.01)
(52) U.S. Cl. .................................. 425/549; 264/328.15
(58) Field of Classification Search .................. 425/549; 264/328.15
See application file for complete search history.

(56) References Cited

U.S. PATENT DOCUMENTS

| | | | |
|---|---|---|---|
| 4,613,296 A | 9/1986 | Nagasaka | |
| 4,771,534 A | 9/1988 | Gellert et al. | |
| 4,837,925 A | 6/1989 | Gellert | |
| 5,266,023 A | 11/1993 | Renwick | |
| 5,312,241 A | 5/1994 | Gunther | |
| 5,334,008 A * | 8/1994 | Gellert | 425/549 |
| 5,591,366 A | 1/1997 | Schmidt et al. | |
| 5,704,113 A | 1/1998 | Mak | |
| 6,530,776 B1 | 3/2003 | Pilavdzic et al. | |
| 6,817,088 B1 | 11/2004 | Lin | |
| RE38,920 E | 12/2005 | Gellert | |
| 7,067,774 B2 | 6/2006 | Hoffmann | |
| 2003/0164363 A1 | 9/2003 | Renwick | |
| 2005/0147713 A1 | 7/2005 | Hagelstein et al. | |
| 2005/0226956 A1 | 10/2005 | Fischer et al. | |
| 2007/0077821 A1 | 4/2007 | Pilavdzic | |
| 2007/0084850 A1 | 4/2007 | Pilavdzic | |
| 2007/0086759 A1 | 4/2007 | Russegger et al. | |

FOREIGN PATENT DOCUMENTS

| | | |
|---|---|---|
| DE | 10-333206 | 4/2004 |
| EP | 0765728 | 4/1997 |
| WO | WO-2005/053361 A2 | 6/2005 |
| WO | WO-2005/053361 A3 | 6/2005 |
| WO | WO 2007/006899 | 1/2007 |

OTHER PUBLICATIONS

"Runnerless Injection Molding Equipment Brochure", *Osco Inc.*, (Apr. 1, 1983).
"Runnerless Molding Systems", *Osco Inc.*, (Jan. 1, 1997).
"Runnerless Molding Systems Brochure", *Osco Inc.*, (Jan. 1, 2003).
Libesh Engineering Works, "Hot Runner System", (Date Unknown), www.libeshengg.com/CoilTubularHeater.asp.

* cited by examiner

*Primary Examiner*—Tim Heitbrink
(74) *Attorney, Agent, or Firm*—Medler Ferro PLLC

(57) ABSTRACT

The invention provides an injection molding nozzle or nozzle segment having a recessed terminal or terminal housing such that the radial profile of the nozzle or nozzle segment is reduced. Components of the nozzle or nozzle segment and injection molding apparatus having the nozzle or nozzle segment are also part of the invention.

20 Claims, 16 Drawing Sheets

INJECTION MOLDING NOZZLE WITH RECESSED TERMINAL

FIELD OF THE INVENTION

This invention relates generally to injection molding apparatus and more particularly to an injection molding nozzle having a terminal of an electrically conductive element.

BACKGROUND OF THE INVENTION

An injection molding nozzle having a terminal of a conductive electrical wire, such as an embedded electrical heating element, is well known in the art. In such nozzle, the heating element is embedded in the nozzle body and includes a small diameter resistance wire which connects to a larger diameter conductor to provide a terminal to which an external electrical lead is connected. This type of structure is disclosed, for example, in U.S. Pat. No. 4,837,925 to Gellert and in U.S. Pat. No. 5,266,023 to Renwick. The terminal is housed in a terminal housing located in a rearward portion of the nozzle and which extends radially outwardly from the nozzle body. The terminal housing is therefore prone to damage during assembly and disassembly of the injection molding nozzle within the mold manifold. Moreover, to accommodate the profile of the nozzle, it is usually necessary to machine an opening or receiver in the mold manifold in which the terminal housing can be seated. The opening or receiver is typically required to be machined to strict tolerances, which adds to manufacturing costs. During assembly, the nozzle typically must be oriented in a specific manner such that the terminal housing can be seated in the opening or receiver. This reduces ease of assembly.

Accordingly, the present invention is intended to provide a new nozzle that alleviates, at least partially, one or more of the above difficulties.

SUMMARY OF THE INVENTION

In accordance with a first embodiment, the present invention provides an injection molding nozzle having a nozzle body and an electrically conductive element coupled to the nozzle body and having at least one end for coupling to an external lead element at a terminal. A terminal housing is provided for containing the terminal and is fastened to the nozzle body, wherein an outer surface of the nozzle is recessed to define a seat and the terminal housing is located in the seat to reduce a radial size dimension of the nozzle.

In another embodiment, the outer surface can be recessed to define a seat for the terminal housing, the seat and terminal housing being dimensioned so that at least 40% of the volume of the terminal housing is contained in the seat.

In one embodiments of the present invention, the electrically conductive element can be a heater comprising an electrical resistance heater wire surrounded by insulation and embedded in the outer surface. The element can also have a portion formed into a U-shaped bend and two opposite ends disposed at the terminal for coupling to two respective external lead wires. The element can further extend into the seat in a direction that is generally tangential to the outer surface.

The terminal housing can be unitary or comprise two mutually complementary members (which can be identical) secured together one on either side of the at least one end of the electrically conductive element.

In accordance with another embodiment of the present invention, there is provided an injection molding apparatus having a mold manifold, a nozzle according to the one of the previous embodiment of the present invention that is seated in the manifold, and at least one electrically insulated lead element electrically coupled to the at least one end of the electrically conductive element in the seat to form a terminal in the seat to reduce a radial size dimension of the nozzle. The at least one electrically insulated lead element and electrically conductive element can extend into the seat in a direction that is generally tangential to the outer surface.

The apparatus can further include a terminal housing fastened to the nozzle body, the terminal housing having openings through which the electrically conductive element and external lead elements extend into the housing, wherein the seat and terminal housing are dimensioned so that at least 40% of the volume of the terminal housing is contained in the seat.

In another embodiment, a nozzle according to the present invention can further include a stress relief member fastenable to the nozzle body and adapted to retain the at least one electrically insulated lead element in a position spaced from the terminal thereby relieving stress on the terminal. The stress relief member can be a part of the terminal housing and have a pair of protrusions extending from an interior surface of the terminal housing, the protrusions engaging the lead elements and clamping the lead elements against an opposite surface of the terminal housing. Alternatively, the stress relief member can be separate from the terminal housing and comprise a pair of arcuate retainers dimensioned to retain and clamp the respective lead elements against the outer surface.

In accordance with another embodiment, the invention provides a nozzle body assembly of an injection molding nozzle including a nozzle body having an outer surface, first and second opposed ends, and an inner surface defining a central melt channel extending between the ends, wherein the outer surface is recessed to define a seat. The seat has a bottom wall and at least three radially-extending side walls, which include a pair of spaced side walls and a third wall connecting the spaced side walls, wherein the third wall defines two openings. An electrically conductive element is coupled to the outer surface and extends into the seat in a direction that is generally tangential to the outer surface. The electrically conductive element has two ends located in the seat for coupling to respective two external lead elements to form a terminal in the seat.

Pursuant to another embodiment of the present invention, there is provided a nozzle body of an injection molding nozzle, the body having an outer surface, first and second opposed ends, and an inner surface defining a central melt channel extending between the ends, wherein the outer surface is recessed to define a seat, the seat having a bottom wall and at least three radially-extending side walls. The three radially-extending side walls include a pair of spaced side walls and a third wall connecting the spaced side walls, wherein the third wall defines two openings. The outer surface is further recessed to define at least one channel for receiving an electrically conductive element, wherein the at least one channel is in fluid communication with the two openings.

The reduced radial profile of injection molding nozzles of the present invention increases ease of assembly and disassembly of the nozzle within the mold manifold and will fit in standard spaces in an injection molding apparatus for housing nozzles. This helps to reduce the overall manufacturing cost of the apparatus. The terminal or terminal housing can be easily located anywhere along the nozzle body since it does not exceed the existing space capacity within the apparatus. Thus, the nozzle can easily have multiple terminals and terminal housings should that be desired. The nozzles may also be assembled closer together in the mold thus saving valuable space in the mold, which can allow for additional mold cavities.

BRIEF DESCRIPTION OF THE DRAWINGS

To facilitate a better understanding of the invention, embodiments of the invention will now be described with reference to the drawings. The drawings are not to scale.

DETAILED DESCRIPTION OF THE INVENTION

Figure 1:
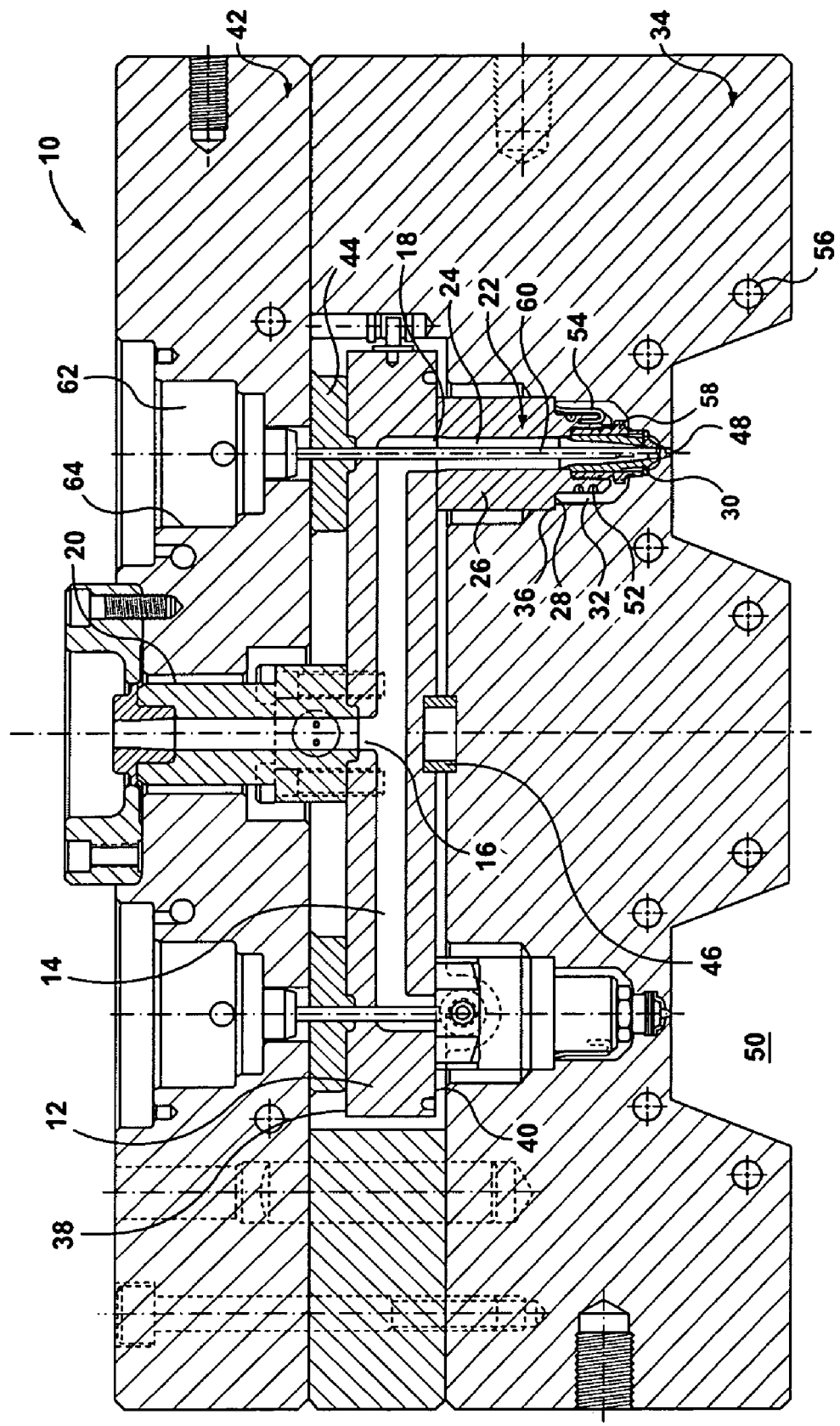
FIG. 1 is a partial sectional view of a prior art injection molding apparatus.

The present invention relates to, among other things, nozzles and components thereof which can be used in injection molding apparatus such as the apparatus 10 shown in FIG. 1. Injection molding apparatus 10 includes a manifold 12 having a manifold melt channel 14. Manifold melt channel 14 extends from an inlet 16 to manifold outlets 18. Inlet 16 of manifold melt channel 14 receives a melt stream of moldable material from a machine nozzle (not shown) through a sprue bushing 20 and delivers the melt to hot runner nozzles 22, which are in fluid communication with respective manifold outlets 18. Although a pair of hot runner nozzles 22 is shown in FIG. 1, it will be appreciated that a typical injection molding apparatus may include only one or a plurality of hot runner nozzles for receiving melt from respective manifold outlets.

Each hot runner nozzle 22 is received in an opening 32 in a mold plate 34. A nozzle head 26 of the hot runner nozzle 22 includes lower surface 28. The lower surface 28 abuts a step 36, which is provided in opening 32 to maintain nozzle head 26 in abutment with a lower surface 40 of manifold 12. A nozzle tip 30 is received in a downstream end of hot runner nozzle 22. The nozzle tip 30 is coupled to the hot runner nozzle 22 by a transfer seal 58. The transfer seal 58 is threaded to the hot runner nozzle 22. A nozzle melt channel 24 extends through hot runner nozzle 22 and nozzle tip 30. Nozzle melt channel 24 is in communication with manifold outlet 18 to receive melt from manifold channel 14. Hot runner nozzle 22 is heated by a heater 52 and further includes a thermocouple 54.

A valve pin 60 extends through nozzle melt channel 24 and is slidable through a valve pin bushing 44, which is provided between manifold 12 and back plate 42. The valve pin 60 is axially movable by an actuator 62 to selectively engage a mold gate 48. The actuator 62 is received in an opening 64 in back plate 42 and may be hydraulic, pneumatic or any other suitable type. A locating ring 46 maintains manifold 12 in position relative to mold plate 34.

Mold cavities 50 are provided between mold plate 34 and a mold core (not shown). Mold cavities 50 receive melt from nozzle melt channels 24 through mold gates 48. Cooling channels 56 extend through mold plate 34 to cool the mold cavities 50. In operation, melt is injected from the machine nozzle into manifold channel 14 of manifold 12 through sprue bushing 20. Nozzle melt channels 24 of nozzles 22 receive melt from manifold outlets 18 and deliver the melt to mold cavities 50 through the mold gates 48. Once the mold cavities 50 have been filled with melt, the melt is cooled and the molded parts are ejected from injection molding apparatus 10.

Figure 2:
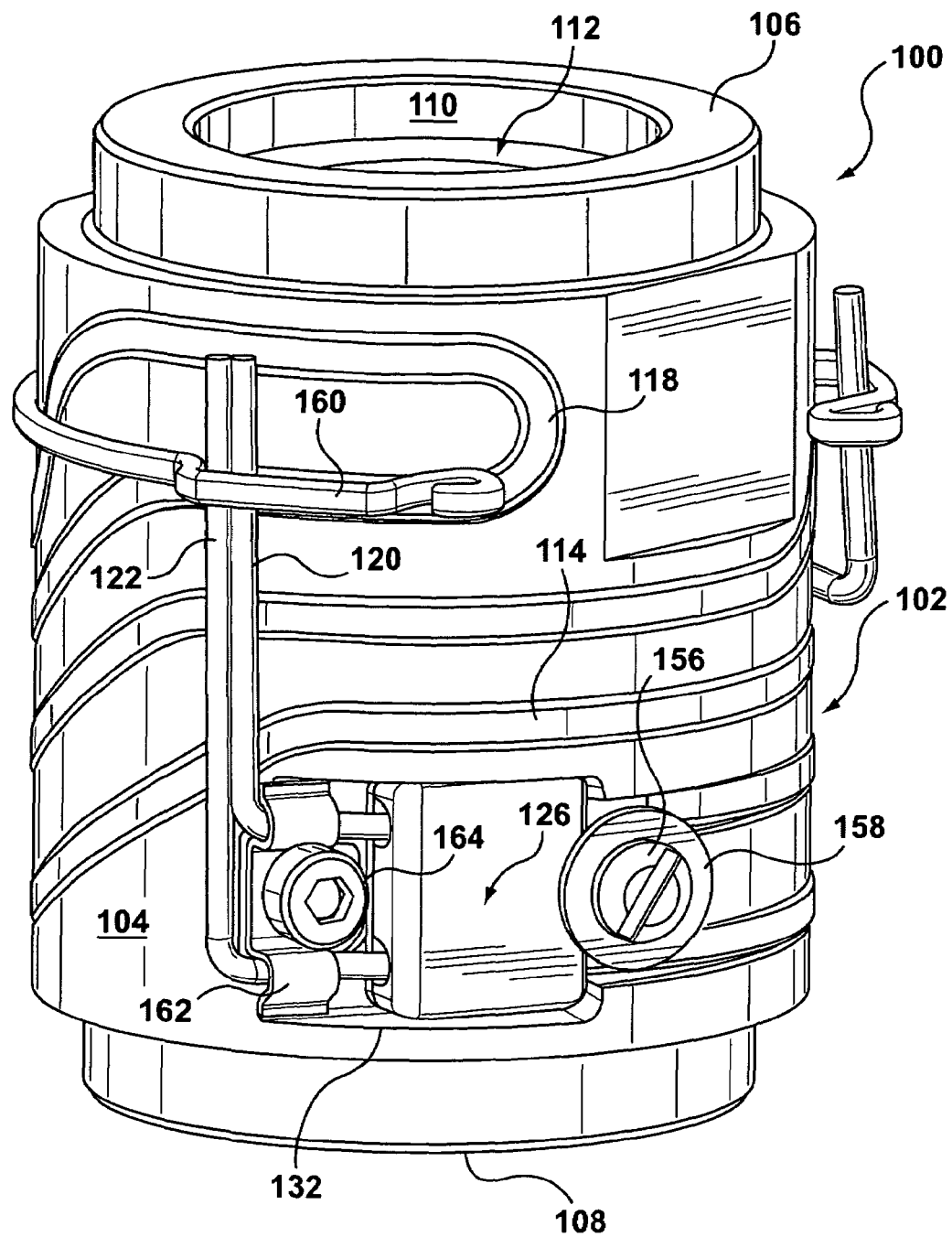
FIG. 2 is an isometric view of an injection molding nozzle segment according to one embodiment of the invention, having a recessed terminal housing, which can be used in the apparatus of FIG. 1.

Embodiments of the invention will now be described with reference to FIGS. 2 to 16. Referring primarily to FIG. 2, but with reference also to FIG. 3, an injection molding nozzle segment according to one embodiment of the invention is shown and designated generally by reference numeral 100. The nozzle segment 100 is a modular component of an injection molding nozzle to be formed therewith and has a cylindrical nozzle body designated generally by reference numeral 102 having an outer surface 104, first and second opposed ends 106, 108 and an inner surface 110 defining a central melt channel 112 extending between the ends 106, 108. As can be seen in FIG. 2, the nozzle body 102 is journaled at both ends to facilitate connection to other nozzle body segments and/or other parts of an injection molding nozzle.

The injection molding nozzle segment 100 further includes an electrically conductive element in the form of a heater 114 coupled to, i.e. embedded in, the outer surface 104 and extending in a spiral configuration as is known in the art. The heater 114 consists of a conductive electrical wire, i.e. a resistance heater wire 116, surrounded by electrical insulation and a sheath over the insulation as is known in the art. The resistance heater wire 116 has a portion 118 formed into a U-shaped bend and two opposite ends which are electrically coupled to ends of electrical wires of two respective external lead elements 120, 122 at a terminal designated generally by reference numeral 124 housed in a terminal housing 126. The ends of the resistance heater wire 116 are crimped to the ends of the wires of the lead elements 120, 122 with the use of metal crimping tubes 128, 130.

Figure 3:
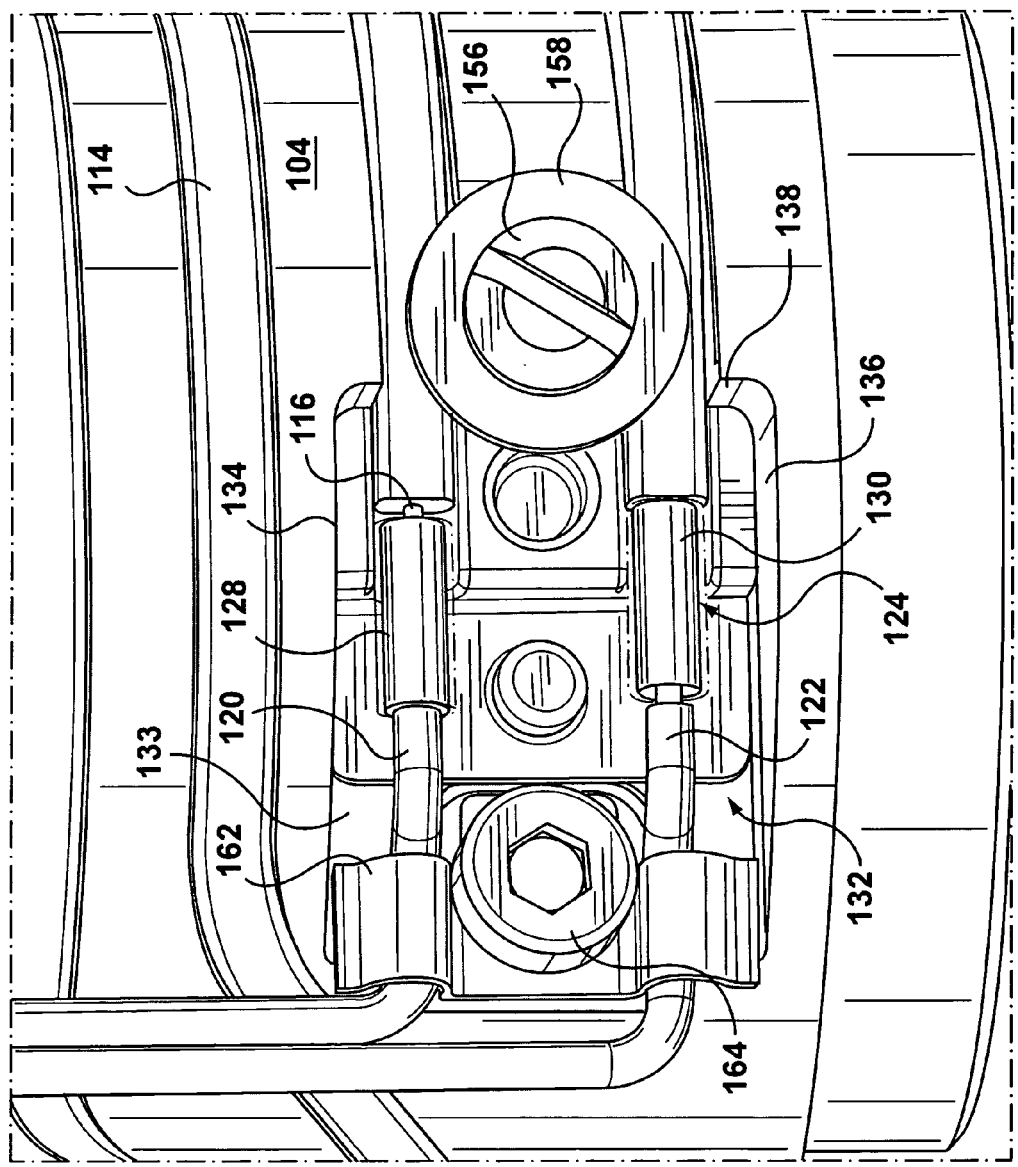
FIG. 3 is an enlarged view of a portion of FIG. 2 showing the recessed terminal housing with an outer terminal housing member thereof removed to show internal structure.

As can be seen best with reference to FIG. 3 (in which an outer housing member of the terminal housing 126 has been removed to show internal structure), the outer surface 104 of the nozzle body 102 is recessed to define a seat designated generally by reference numeral 132 for the terminal housing 126. The seat 132 has a bottom wall 133 and three radially-extending side walls, namely two spaced parallel side walls 134, 136 and a third wall 138 connecting the parallel side walls 134, 136. The third wall 138 is provided with two openings through which ends of the heater 114 extend in parallel into the seat 132 in a direction that is generally tangential to the outer surface 104.

When used herein, the term "generally tangential to the outer surface" shall mean in a plane that is tangential to the outer surface 14 or in a plane that is parallel to the plane, or at an angle that deviates in either direction from the plane or parallel plane by up to 10°.

Similarly, the lead elements 120, 122 extend generally tangentially to the outer surface 104 into the terminal housing 126 to assist in reducing the radial profile of the nozzle segment 100. This is facilitated by guide or retainer components that will be described further below.

Figure 4:
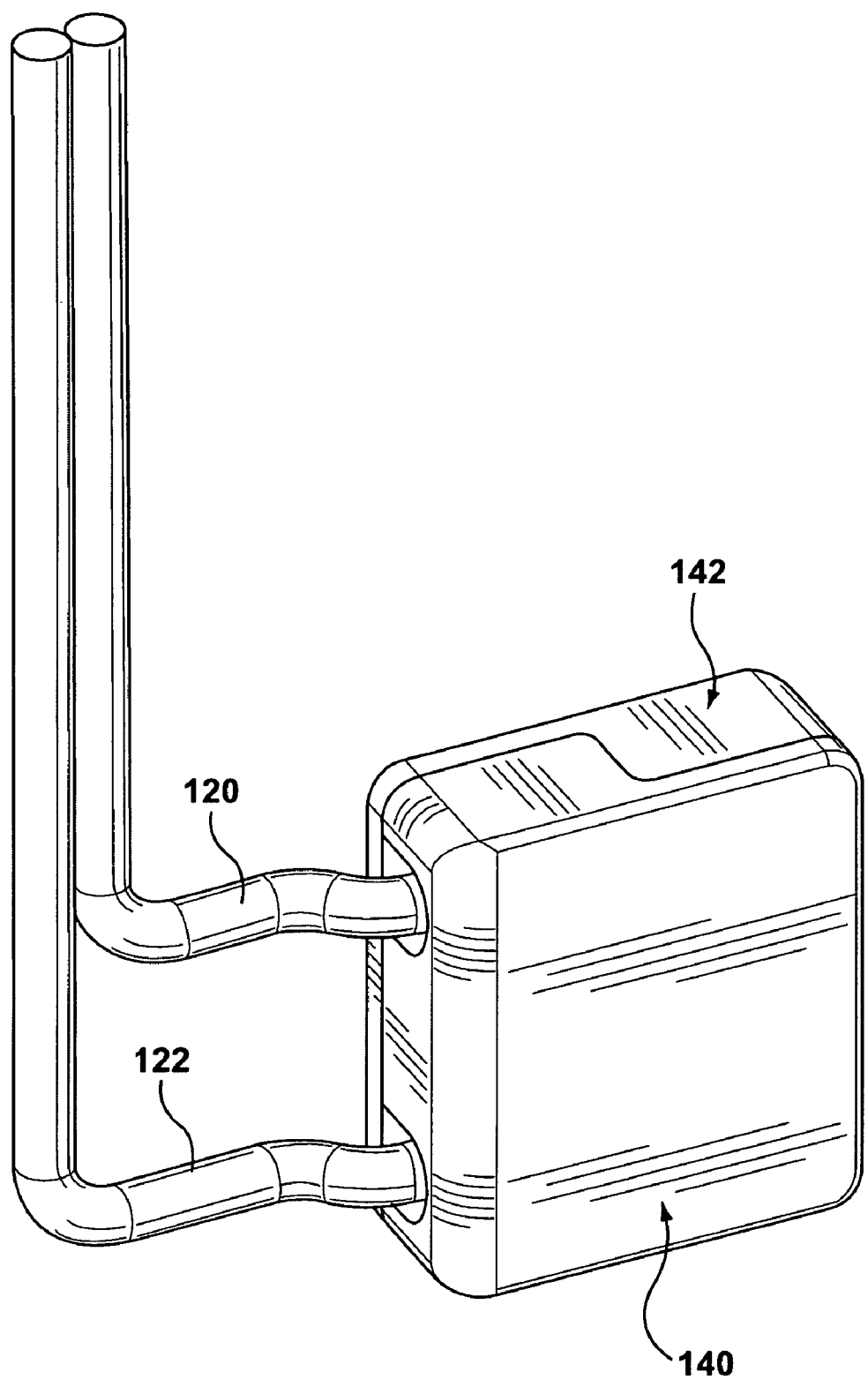
FIG. 4 is an isometric view of the terminal housing of the injection molding nozzle segment of FIG. 2 shown in an assembled condition.
Figure 5:
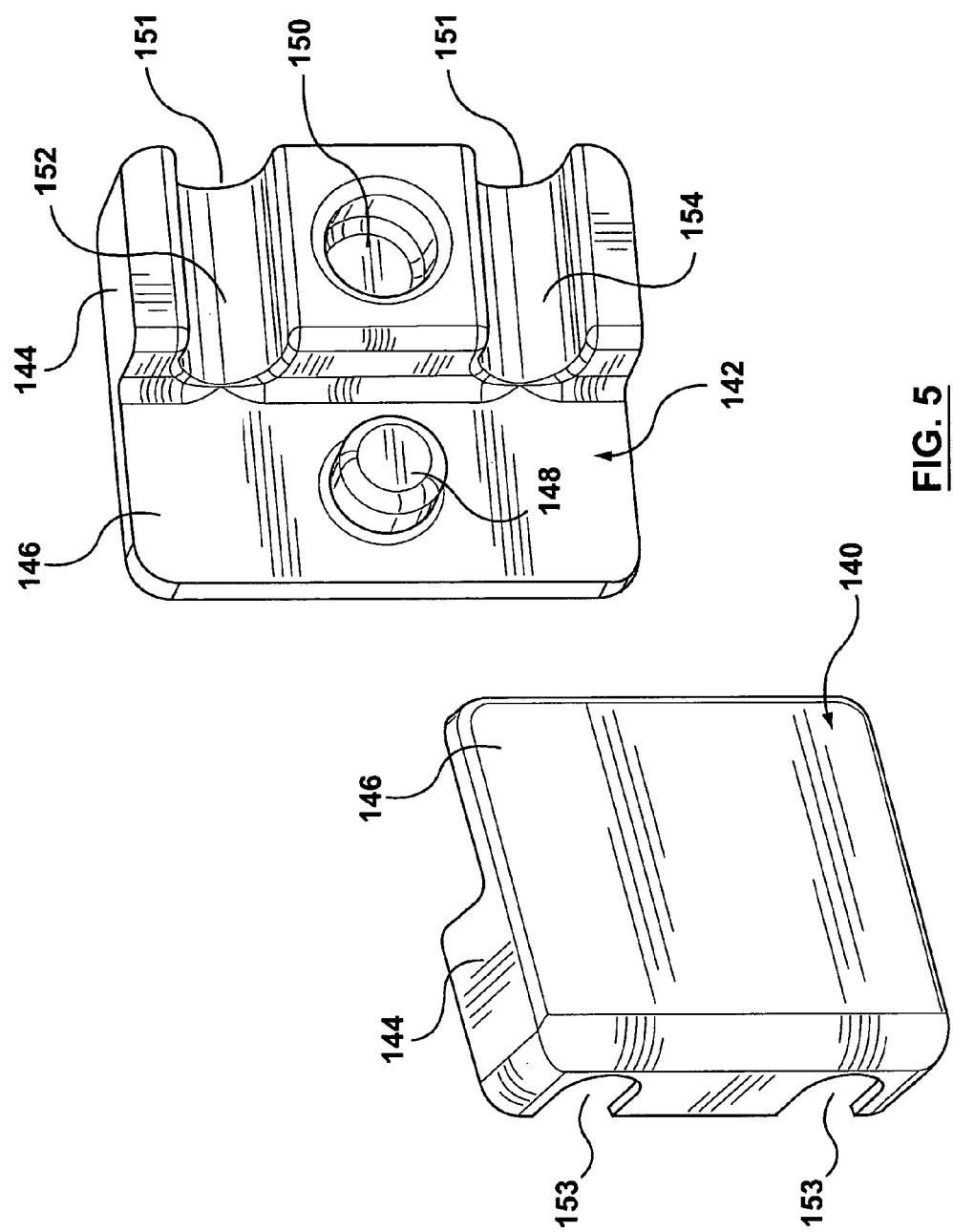
FIG. 5 is an isometric view of the terminal housing of the injection molding nozzle segment of FIG. 2, shown in an unassembled or exploded condition.

As can be seen best with reference to FIGS. 4 and 5, the terminal housing 126 consists of two mutually complementary and identical terminal housing members designated generally by reference numerals 140, 142 secured together one on either side of the terminal 124. Each terminal housing member 140, 142 has a thick half 144 and a thin half 146. The thin half 146 defines a male protrusion 148 while the thick half 144 defines a female receiver 150 which mates with the male protrusion 148 of the other housing member. The thick half 144 of each terminal housing member 140, 142 also defines a pair of channels 152, 154 extending between openings 151, 153 in the terminal housing 126 for receiving the electrical elements within the terminal housing 126. The terminal housing members 140, 142 are secured together and to the nozzle body 102 by a fastener in the form of a set screw 156 and washer 158 as can be seen best with reference to FIG. 2. The set screw 156 is screwed radially into the nozzle body 102 and causes the washer 158 to engage and clamp the terminal housing 126 to the seat 132.

To assemble an injection molding nozzle having the presently described injection molding nozzle segment 100 in an injection molding apparatus, the nozzle segment 100 is first assembled into an injection molding nozzle by adding other components as are known in the art. The resistance heater wire ends 116 of the heater 114 are then crimped to the ends of the wires of the lead elements 120, 122 to form the terminal 124. Then, the terminal housing members 140, 142 are assembled one on either side of the terminal 124 and attached to the seat 132 using the set screw and washer 156, 158. The lead elements 120, 122 lead to an external controller (not shown) which controls the energizing of the heater 114 of the nozzle. As can be seen with reference to FIG. 2, the lead elements 120, 122 are guided along the length of the nozzle segment 100 using an arcuate metal retaining clip 160. During assembly of the nozzle within the manifold of an injection molding apparatus, the lead elements 120, 122 may be pulled thereby putting stress on the terminal 124. To reduce this stress, which may impair the connection between the wires of the lead elements 120, 122 and ends of the resistance heater wire 116 of the heater 114, a stress relief member 162 in the form of a bent rectangular metal strip 162 is employed. The strip 162 has a central opening (not shown) and end portions bent to provide retainers for the lead elements 120, 122. With end portions of the lead elements 120, 122 held in the retainers, the stress relief member 162 is fastened to the nozzle body 102 using a hex bolt 164 screwed radially into the nozzle body 102. Thus, pulling on the lead elements 120, 122 during assembly of the nozzle within the mold manifold will minimize stress on the terminal 124 that may lead to a loose electrical connection. Moreover, this arrangement causes end portions of the lead elements to lie against the bottom wall 133 of the seat 132 so that they extend generally tangentially to the outer surface 104 into the terminal housing 126 to minimize the radial profile of the nozzle segment 100.

FIGS. 6 to 9 illustrate a nozzle segment designated generally by reference numeral 200 according to another embodiment of the invention. In the description of this embodiment, like reference numerals in the 200 series are used to describe like parts for ease of understanding.

Figure 6:
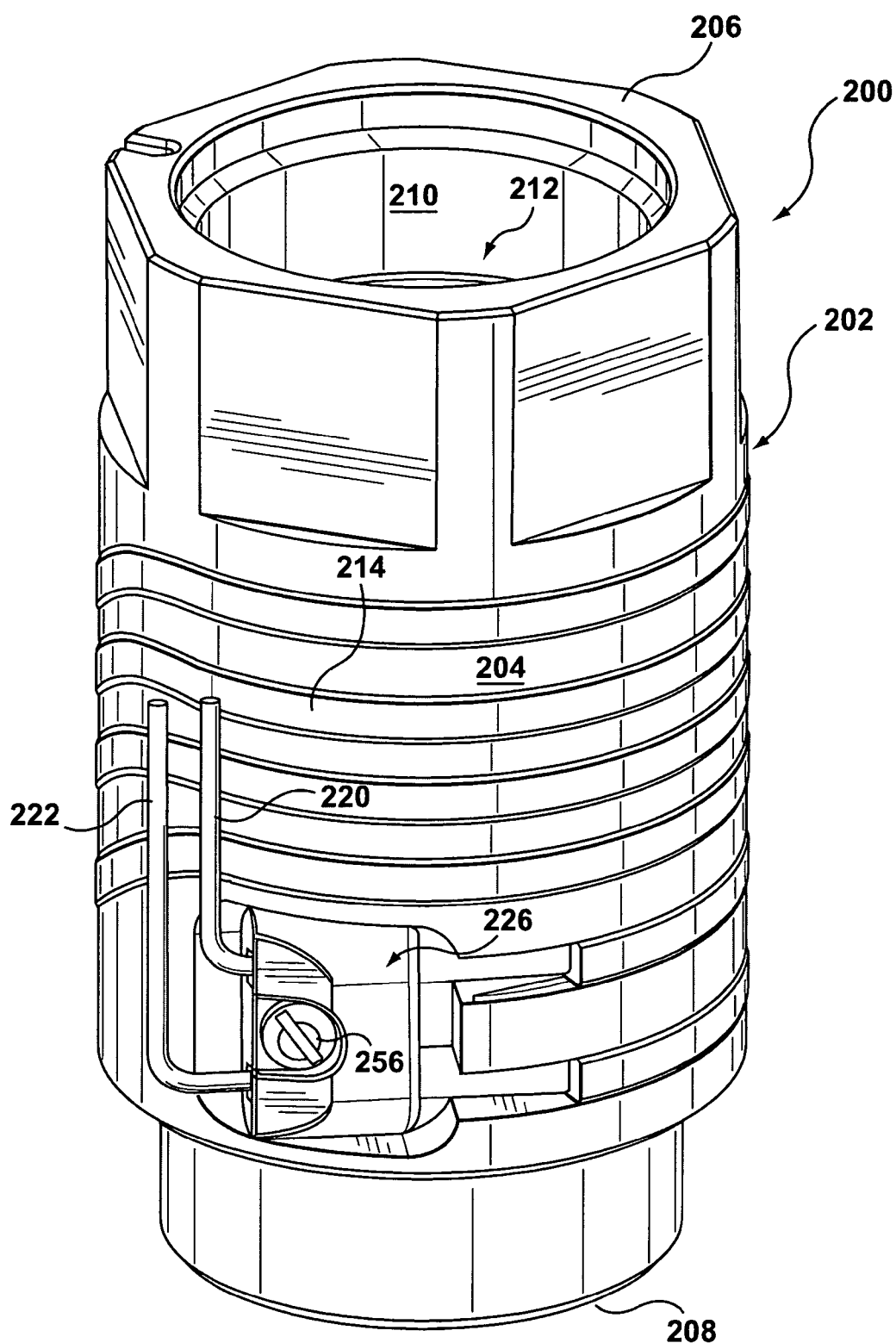
FIG. 6 is an isometric view of an injection molding nozzle segment according to another embodiment of the invention, having a different nozzle body and recessed terminal housing as compared to those shown in FIG. 2, which can be used in the apparatus of FIG. 1.
Figure 7:
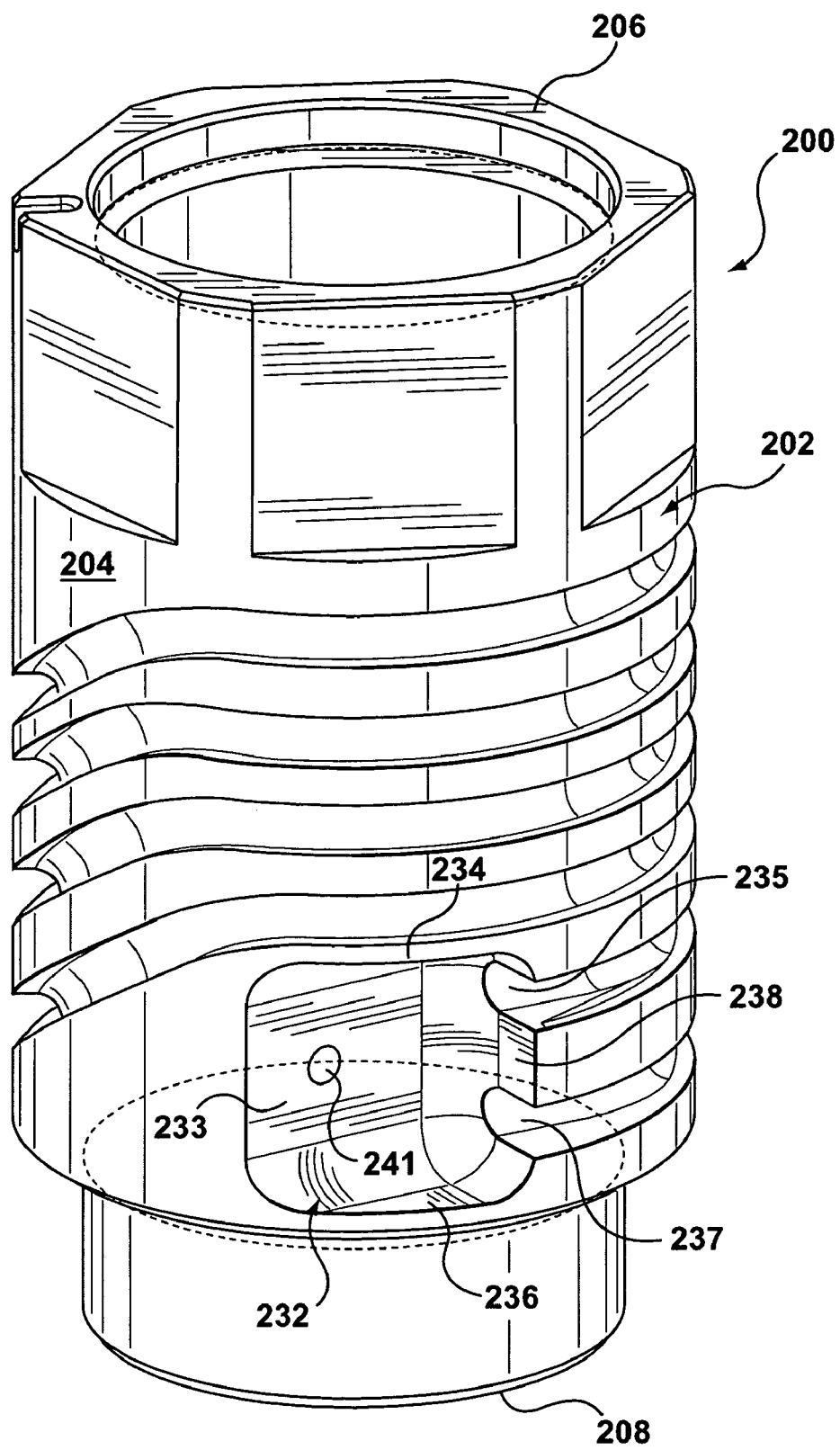
FIG. 7 is an isometric view of a nozzle body of the injection molding nozzle segment of FIG. 6.

Referring to FIGS. 6 and 7, the nozzle segment 200 is similar to the nozzle segment 100 except that it has a nozzle body 202 and heater 214 of a different shape and configuration, as shown. The nozzle body 202 has one end 206 journaled in the shape of a hexagon and an opposite end 208 journaled in the shape of a circle. Like the first embodiment, the heater 214 has a portion bent into a "U" shape (not shown). Furthermore, the nozzle segment 200 has an outer surface 204 that is recessed to define a seat 232 having a bottom wall 233 and three radially-extending side walls, namely two spaced parallel side walls 234, 236 and a third wall 238 connecting the parallel side walls 234, 236. The third wall 238 is provided with two openings 235, 237 through which ends of the heater 214 extend in parallel into the seat 232 and a terminal housing 226 in a direction that is generally tangential to the outer surface 204. Similarly, lead elements 220, 222 extend in a direction generally tangential to the outer surface 204 into the terminal housing 226 and seat 232 to maintain the low radial profile of the nozzle segment 200.

Figure 9:
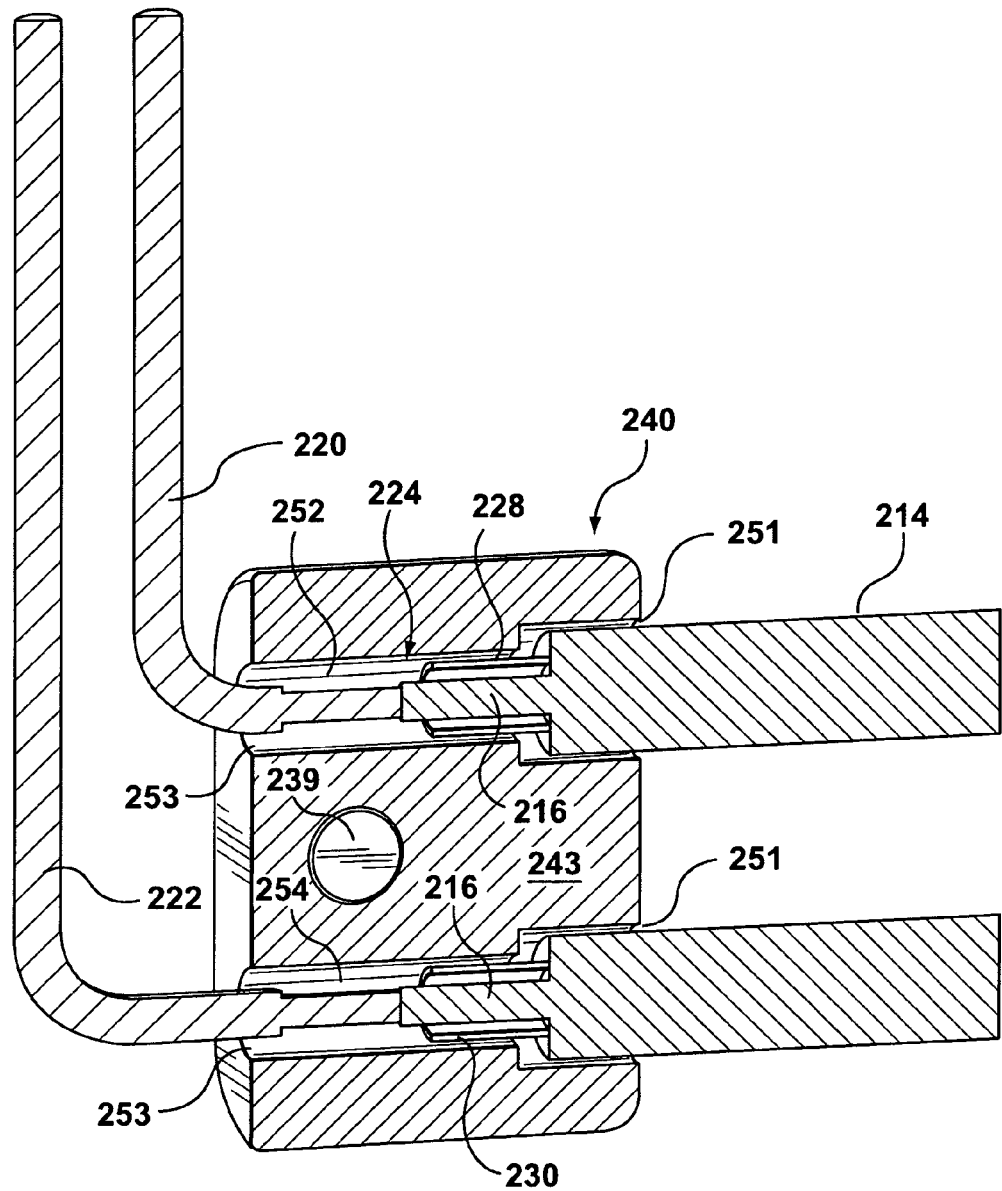
FIG. 9 is an isometric view of the terminal housing of the injection molding nozzle segment of FIG. 6 with an outer terminal housing member removed to show internal structure.

As can be seen best with reference to FIG. 9, the terminal housing 226 consists of two mutually complementary and identical terminal housing members with only one of the members being shown and designated generally by reference numeral 240. The terminal housing members 240 have a different shape and configuration as compared to the terminal housing members 140, 142 of the first described embodiment, as shown. Each terminal housing member 240 has a planar interior surface 243 which lies flush against the planar interior surface 243 of the other terminal housing member 240, when the housing members 240 are secured together. Sandwiched between the terminal housing numbers 240 is a terminal designated generally by reference numeral 224 at which the ends of a resistance heater wire 216 of the heater 214 are crimped to ends of wires of the lead elements 220, 222 using metal crimping tubes 228, 230. To accommodate the terminal 224, heater 214, and lead elements 220, 222, the planar interior surfaces of the housing members 240 are recessed to define complementary channels 252, 254 extending between pairs of opposite end openings 251, 253. The terminal housing members 240 are secured together and to the nozzle body 202 by a fastener in the form of a set screw 256 which extends through a radial opening 239 of the terminal housing 226 and into a complementary threaded opening 241 in the nozzle body 202 (FIG. 7).

In this embodiment, no stress relief member such as the stress relief member 112 of the first embodiment is utilized as such component is optional. It will be appreciated that a suitable structure could be utilized to keep end portions of the lead elements 220, 222 flush against the nozzle outer surface 204 and to provide stress relief for the terminal 224.

Figure 8:
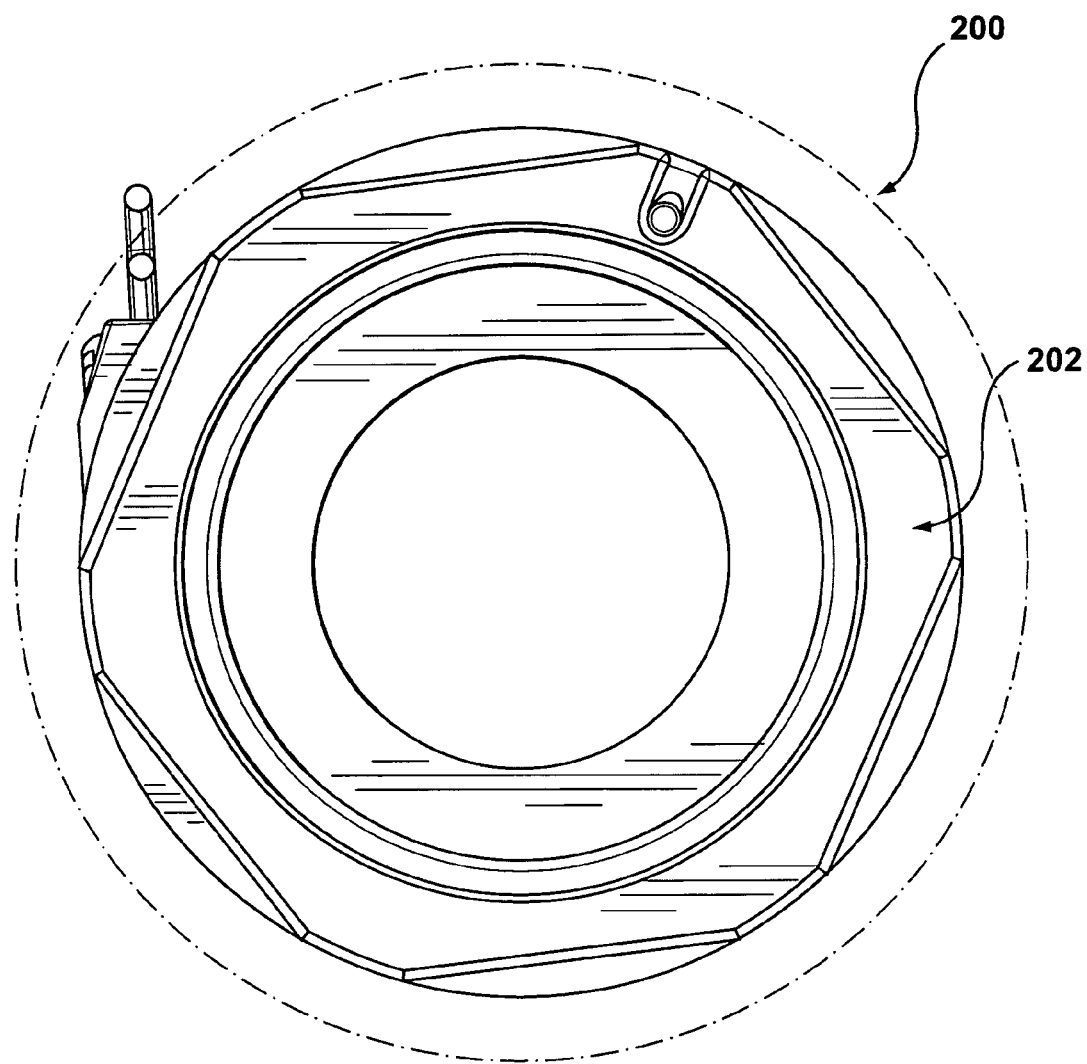
FIG. 8 is a top view of the injection molding nozzle segment of FIG. 6.

Referring to FIG. 8, which is a top view of the nozzle segment 200, it can be seen that the seat 232 is dimensioned so that at least 90% of the volume of the terminal housing 226 is contained in the seat 232 to reduce a radial size dimension of the nozzle segment 200.

The nozzle segment 200 is assembled in an injection molding apparatus in a similar fashion to the first described embodiment.

Figure 10:
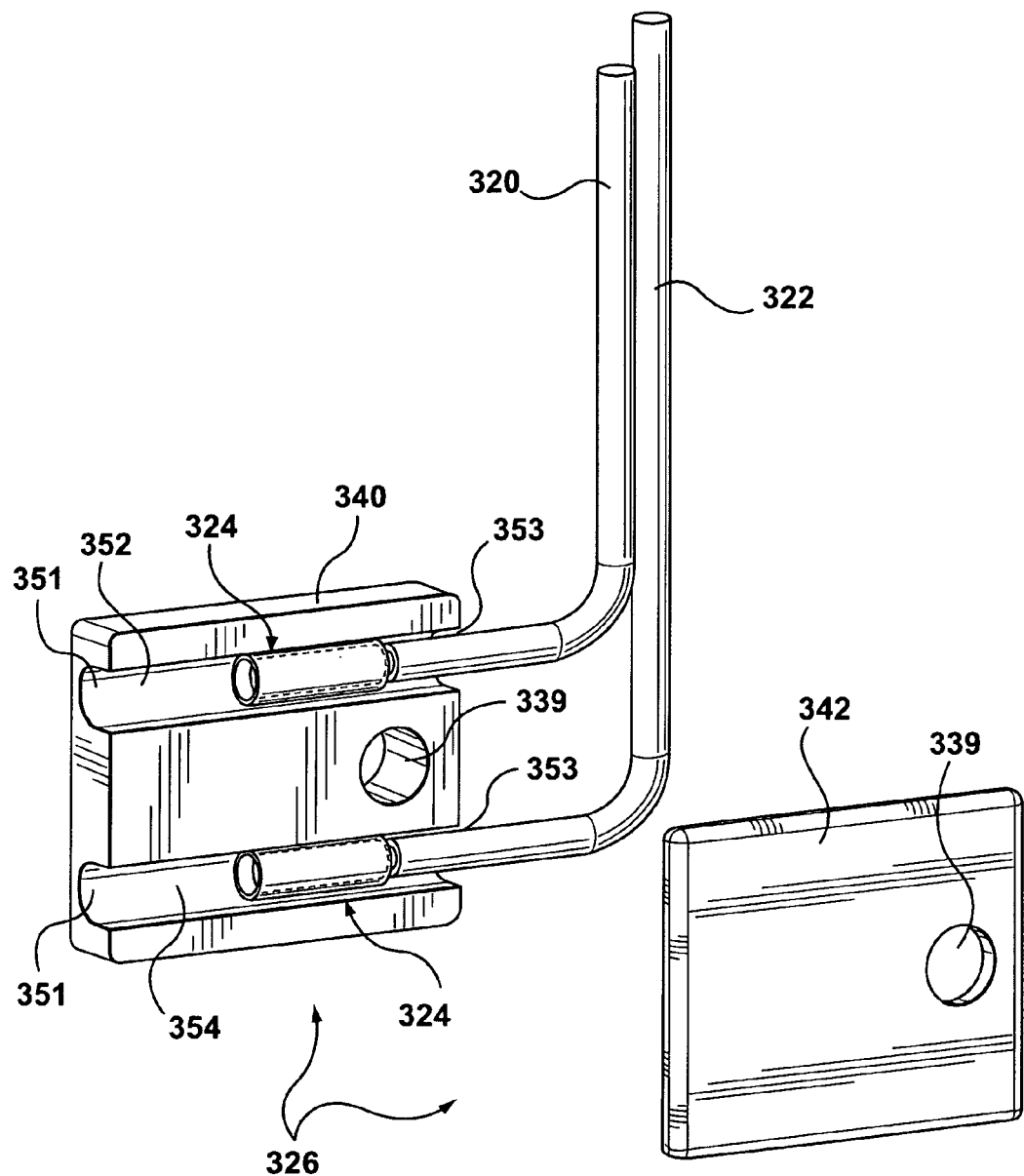
FIG. 10 is an isometric exploded view of a further embodiment of a terminal housing that can be used in the nozzles, nozzle segments and apparatus according to the present invention.
Figure 11:
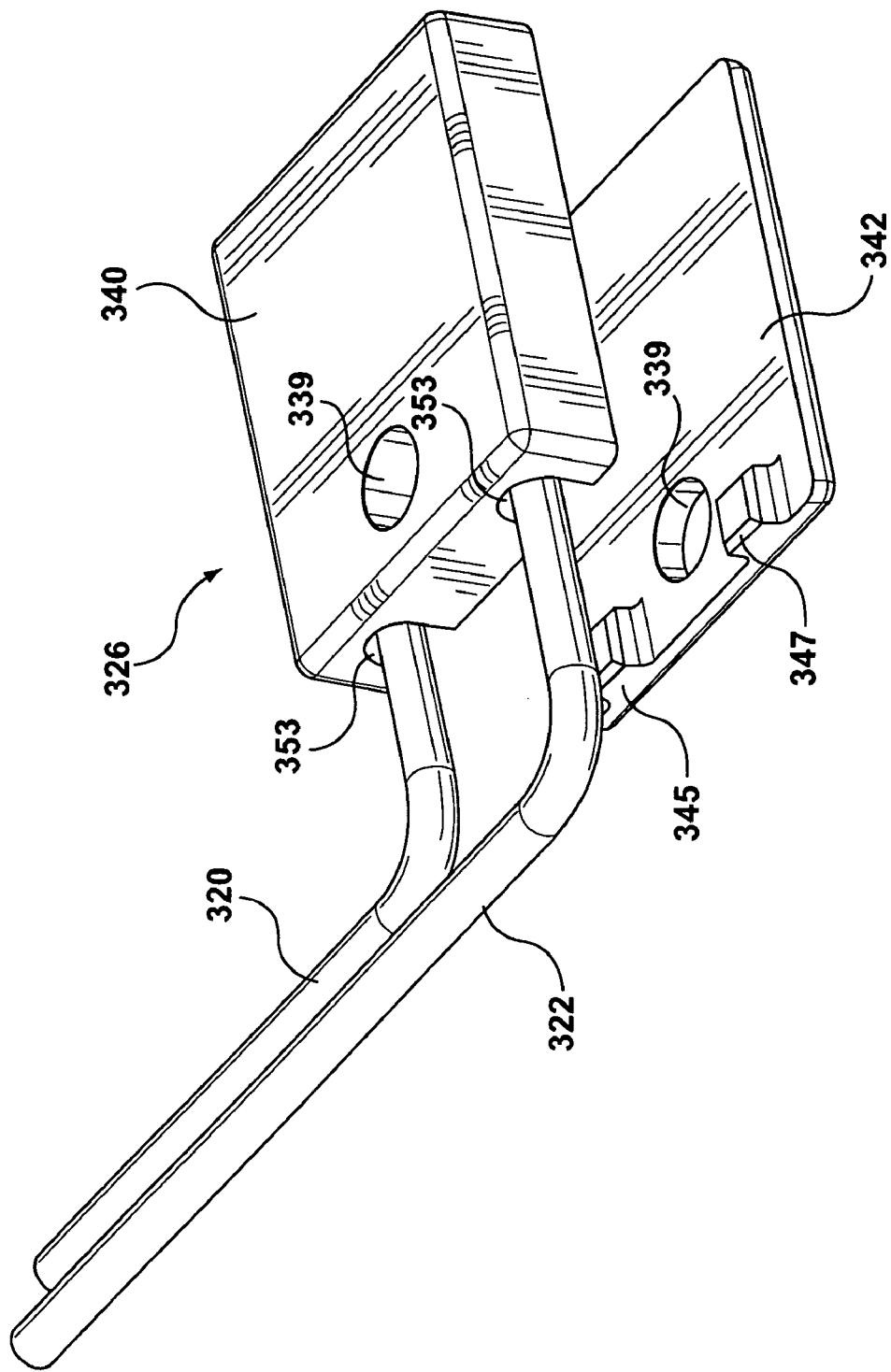
FIG. 11 is an isometric exploded view of the terminal housing of FIG. 10 shown from another angle to reveal internal structure.
Figure 12:
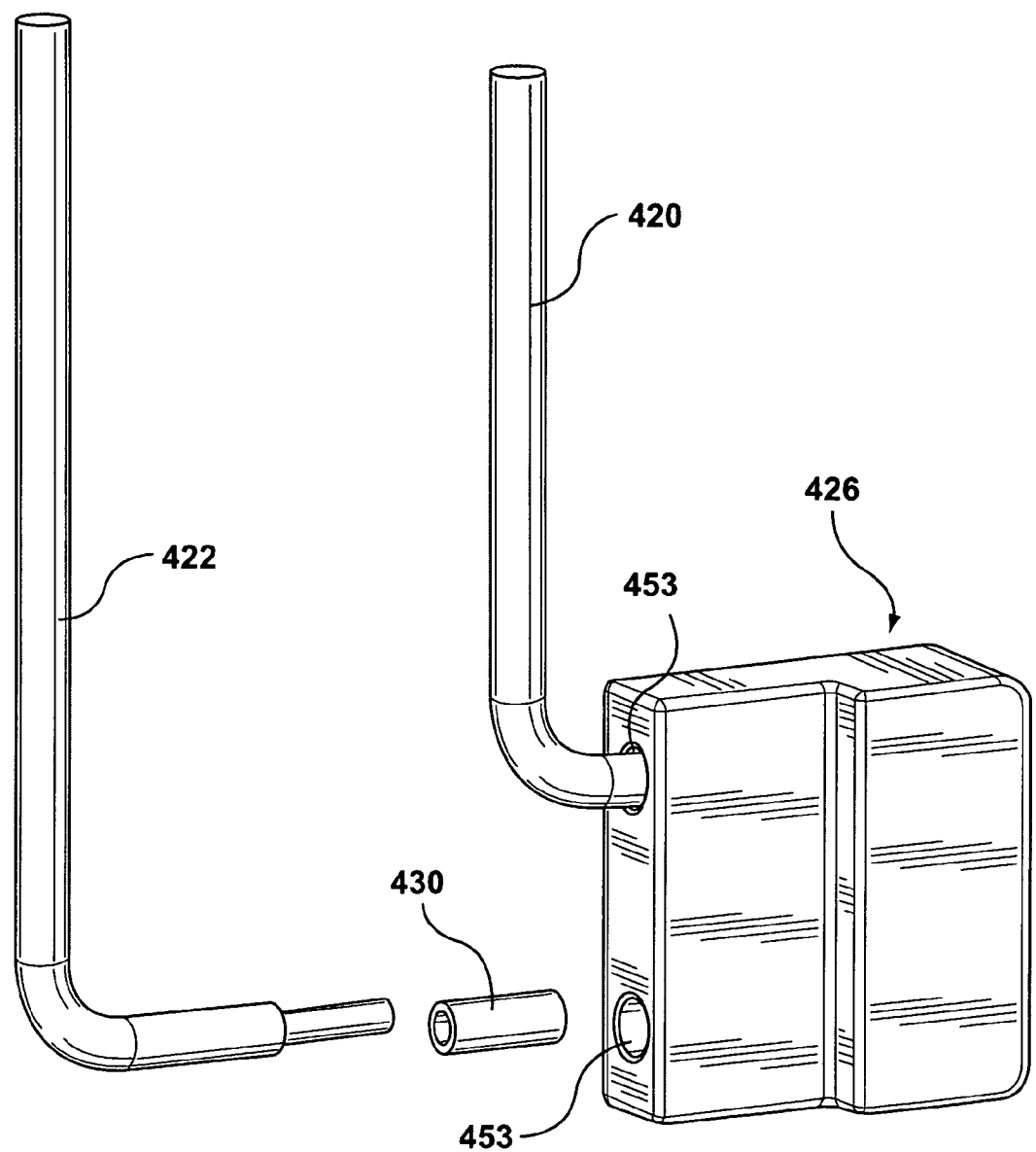
FIG. 12 is an isometric view of yet another embodiment of a terminal housing that can be used in nozzles, nozzle segments and apparatus according to the present invention.

FIGS. 10 to 12 illustrate alternative embodiments of terminal housings which may be used in the context of the present invention. These embodiments will be described using reference numerals similar to reference numerals used to describe the first embodiment except they will be in the "300" and "400" series.

Referring to FIGS. 9 and 10, a terminal housing 326 consists of two mutually complementary rectangular terminal housing members 340, 342 that are securable together and to a nozzle body by a fastener (not shown). The fastener may be a set screw such as the set screw 256 used in the second described embodiment. However, it can also be bolt or other suitable fastener which is capable of extending through a radial opening 339 in the terminal housing 326 and into the nozzle body (not shown).

In this embodiment, the terminal housing members 340, 342 are not identical. The radially outward terminal housing member 340 is thicker than the radially inner housing member 342 and grooved to define two channels 352, 354, extending between pairs of openings 351, 353, for receiving a terminal 324 and end portions of external lead elements 320, 322 and a heater (not shown). The terminal housing member 342 consists of a relatively thin rectangular plate having on its inner surface 180 a pair of square protrusions 345, 347 which are aligned with the channels 352, 354. When the terminal housing 326 is assembled, the protrusions 345, 347 pinch the end portions of the lead elements 320, 322 against the radially outer housing member 340 to provide some stress relief for the terminal 324. Thus, pulling on the lead elements 320, 322 during assembly would be less likely to result in a loose connection at the terminal 324.

Referring now to FIG. 12, a terminal housing designated generally by reference numeral 426 according to a further embodiment is shown. The terminal housing 426 is a unitary structure having two spaced parallel channels extending between a pair of openings 453 at one end and a pair of openings (not shown) at an opposite end. To assemble a nozzle with this terminal housing, end portions of lead elements 420, 422 are inserted through both pairs of openings in the terminal housing 426 and crimped to end portions of a resistance heater wire of a heater (not shown) using metal crimping tubes (only crimping tube 430 being shown) to form a terminal. The terminal housing 426 is then slid over the terminal and retained within a seat formed in a nozzle body using a suitable fastener, such as the set screw and washer 156, 158 shown in FIG. 3.

Figure 13:
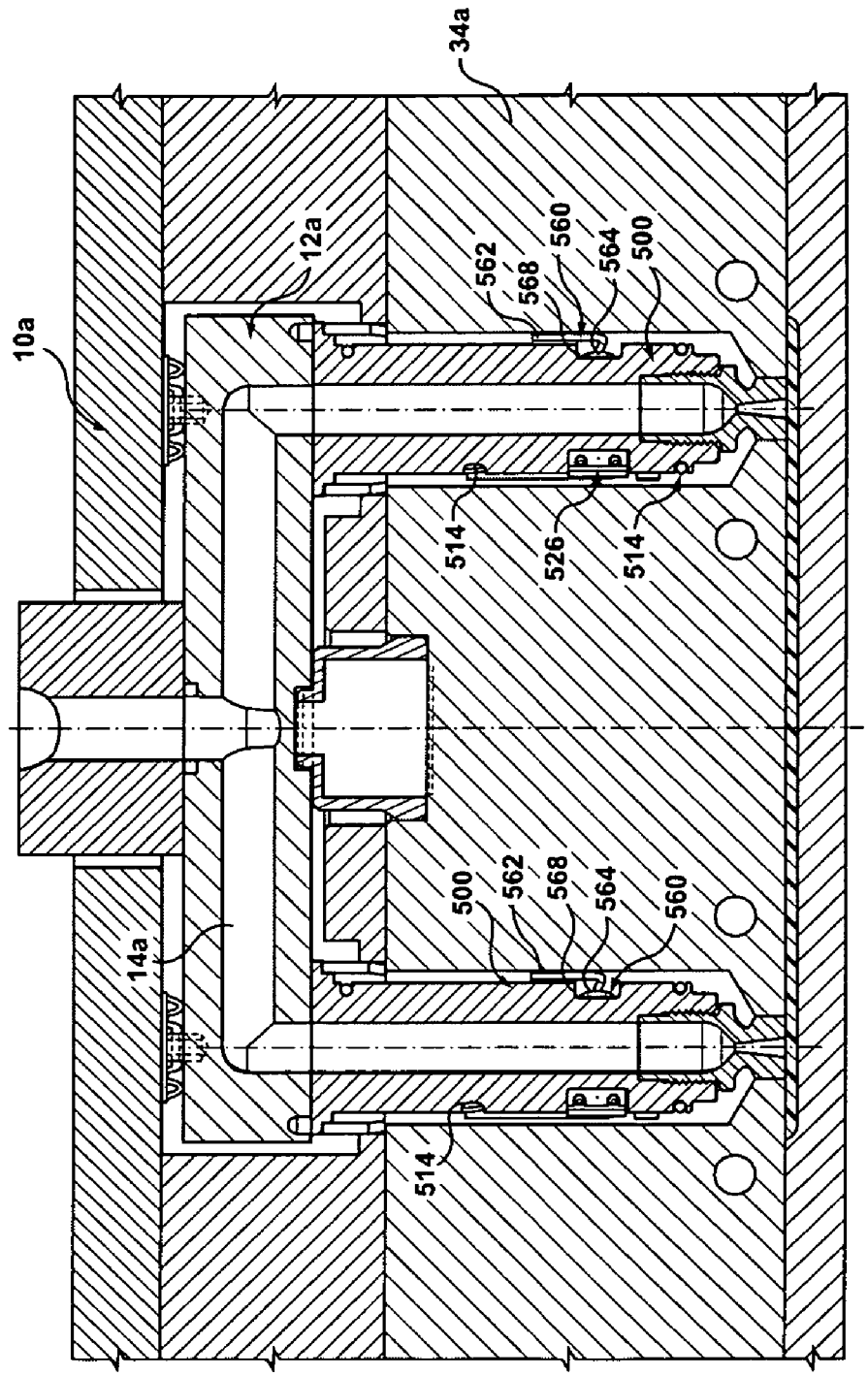
FIG. 13 is a side sectional partial view of an injection molding apparatus according to the present invention having two injection molding nozzles with recessed terminal housings.
Figure 14:
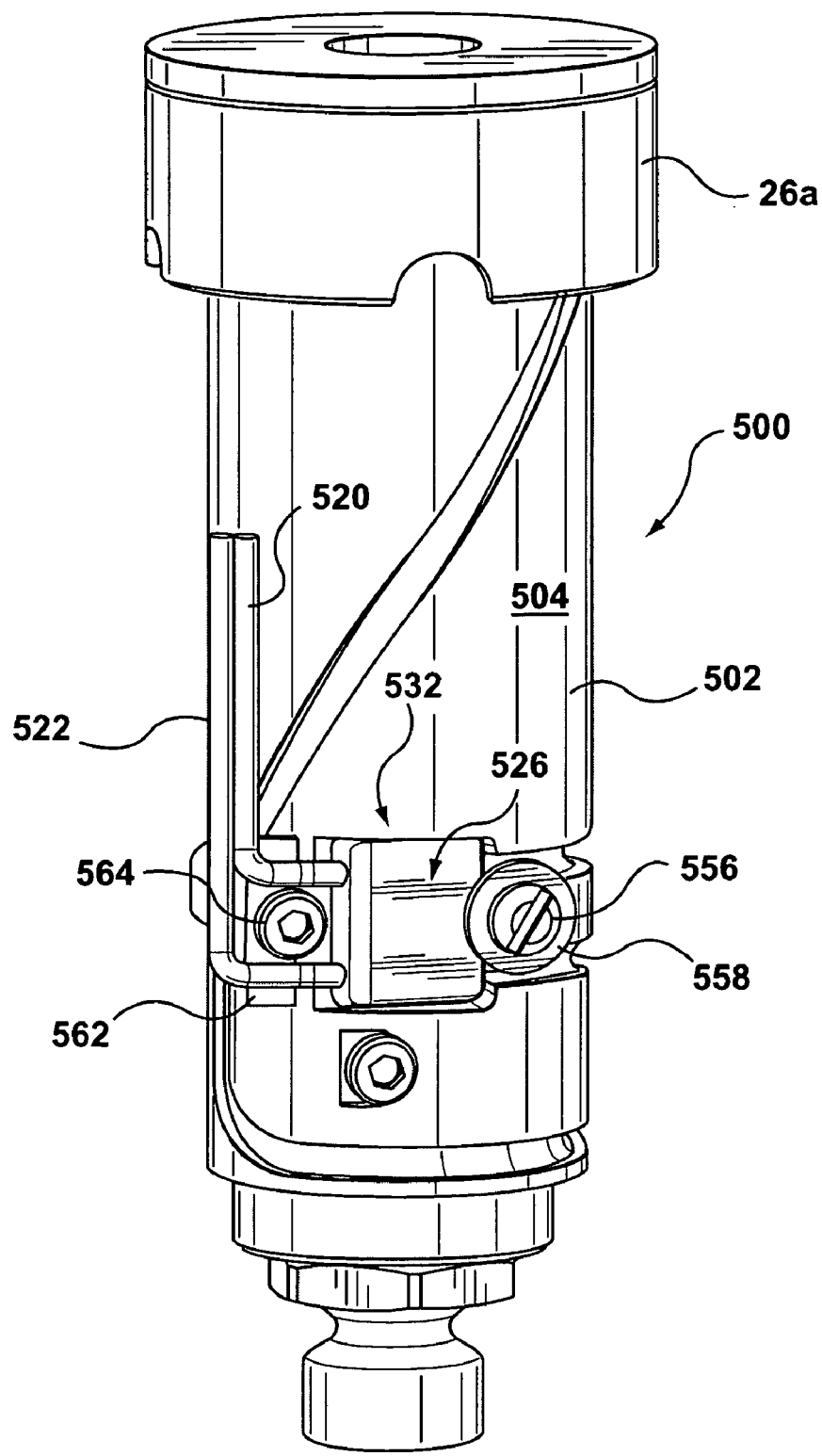
FIG. 14 is an isometric view of the injection molding nozzle, according to the present invention, used in the apparatus of FIG. 13.

Referring now to FIG. 13, an injection molding apparatus designated generally by reference numeral 10a according to a further embodiment of the invention is shown. The apparatus 10a comprises a mold manifold 12a and two injection molding nozzles designated generally by reference numeral 500 seated in the manifold 12a. FIG. 14 illustrates one of the injection molding nozzles 500. As can be seen with reference to FIG. 14, the apparatus 10a includes, for each injection molding nozzle 500, a pair of electrically insulated lead elements 520, 522 having end portions extending generally tangentially to an outer surface 504 of the injection molding nozzle 500. The end portions of the lead elements 520, 522 are electrically coupled to respective ends of a resistance heater wire of a heater 514 (shown only in FIG. 13) embedded in the outer surface 504 of the nozzle 500 in the same manner as described with reference to the first embodiment above. Thus, a terminal (not shown) is formed at the connection of the wires of the lead elements 520, 522 with the ends of the resistance heater wire of the heater 514. The terminal is contained in the terminal housing 526 similar to the terminal housing 126 of the first embodiment. As can be seen with reference to FIG. 13, more than 90% of the terminal housing 526 is contained within a seat 532 formed in the outer surface 504 such that a radial profile of the nozzle is reduced. The terminal housing 526 is secured to a nozzle body 502 of the nozzle 500 in the same manner as described with reference to the first embodiment. That is, a set screw 556 is screwed radially into the nozzle body 502 with a washer 558 disposed between a head of the set screw 556 and the terminal 526 to clamp the terminal housing against the nozzle body 502 within the seat 532. Similarly, a stress relief member 562 is used to relieve stress on the terminal and secured to the nozzle body 502 using a hex bolt 564.

In contrast with typical injection molding nozzles, the terminal is located downstream of a nozzle head 26a of the injection molding nozzle 500. This highlights one benefit of the present invention, namely, that the terminal and terminal housing 526 can be located anywhere along the length of the nozzle body 502 since the terminal housing 526 is able to fit within the usual space provided in mold plate 34a of the apparatus 10a for receiving the nozzles 500.

In this embodiment, the nozzles 500 further include sensors in the form of thermocouples designated generally by reference numeral 560. The thermocouple each comprise a sensor element (not shown) coupled electrically to a further external lead element 562 at a terminal contained in a housing 564 that is contained in a recessed seat 568 provided in the outer surface 504. As can be seen in FIG. 13, the housing for the thermocouple terminal is contained entirely within the recessed seat 568.

Figure 15:
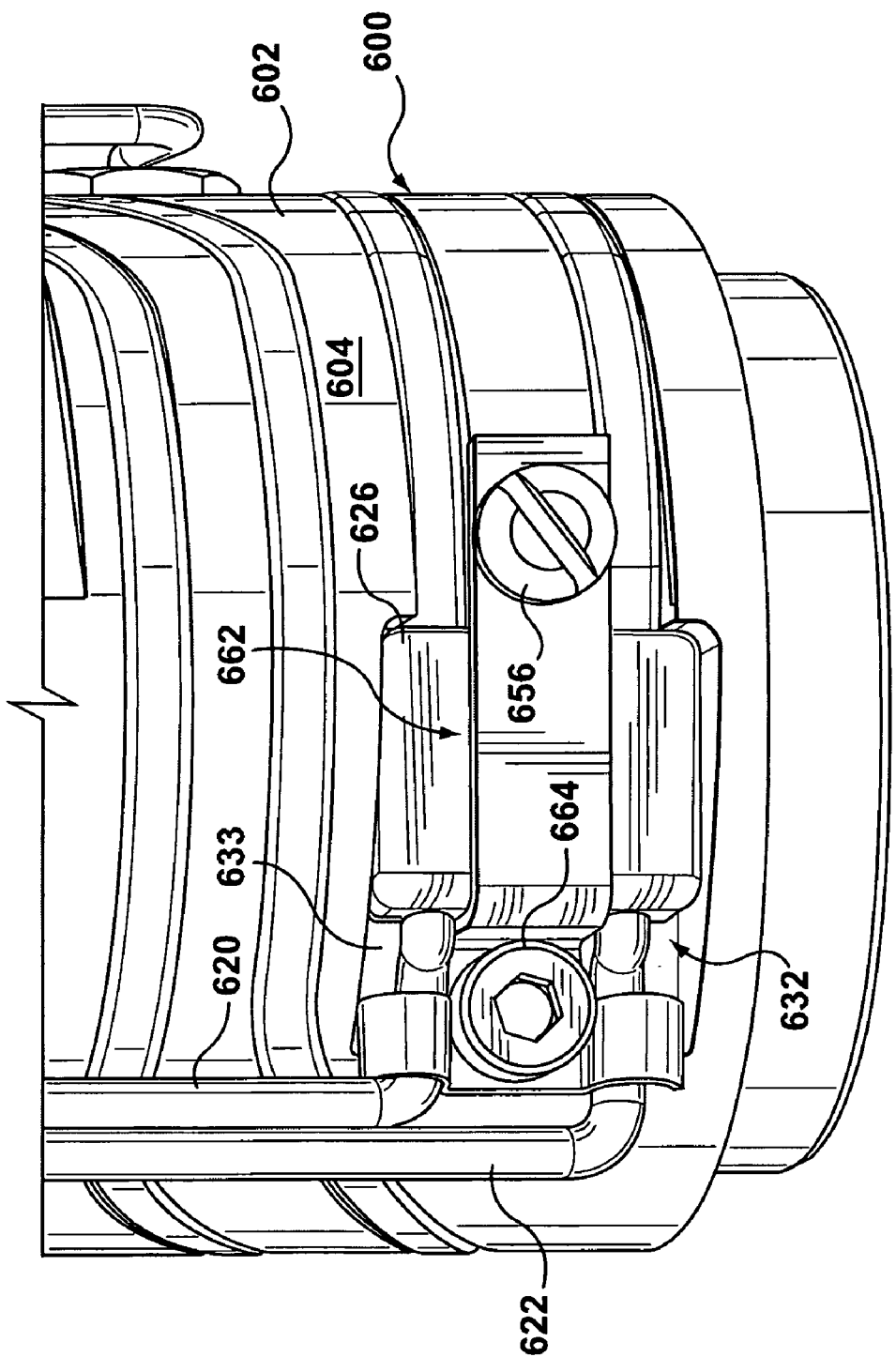
FIG. 15 is a partial isometric view of an injection molding nozzle according to the present invention having an alternative fastener for fastening the terminal housing to the nozzle body.
Figure 16:
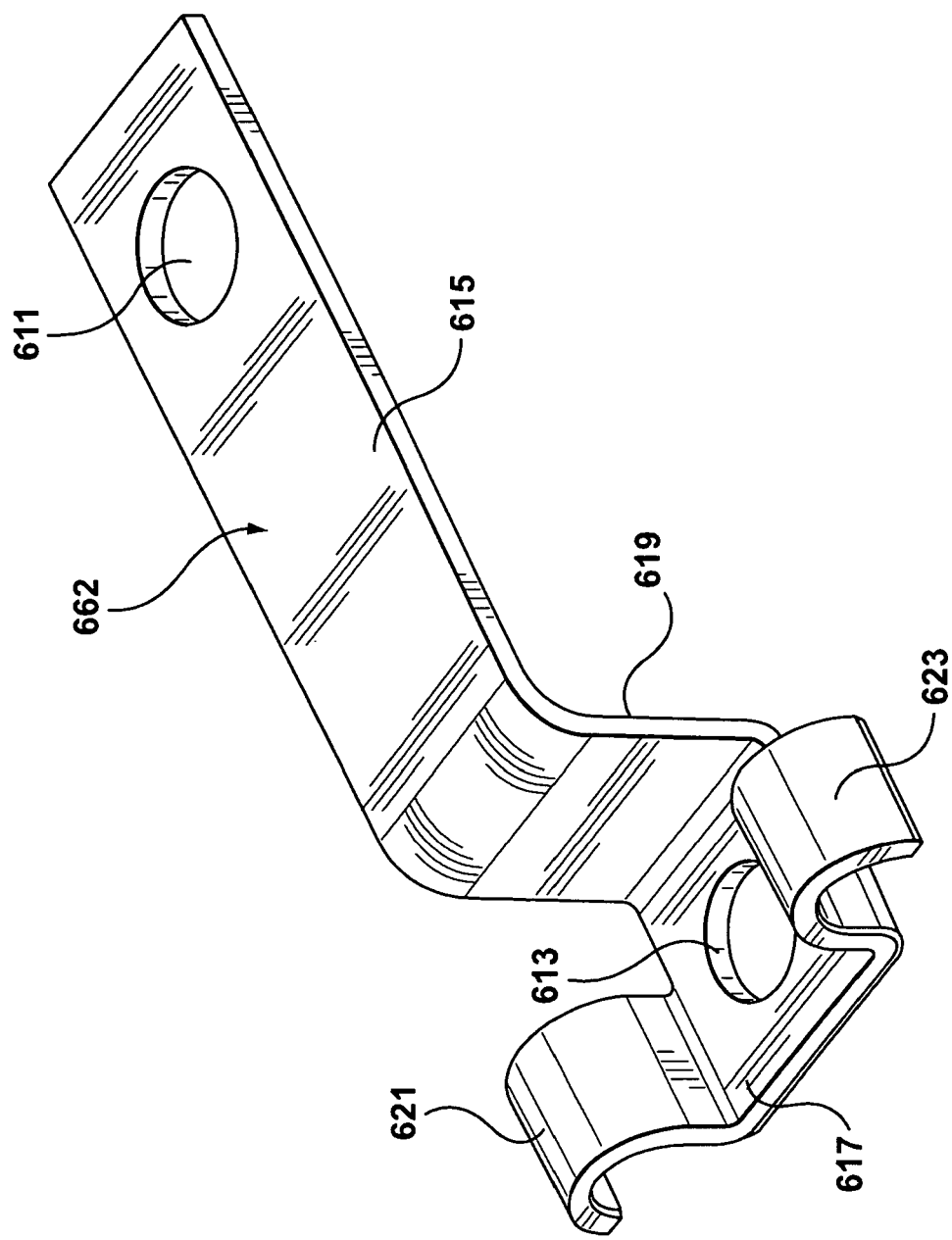
FIG. 16 is an isometric view of the fastener of FIG. 15.

Referring now to FIGS. 15 and 16, a stress relief and fastener member designated generally by reference numeral 662 which can be used in the context of the present invention is shown. The member 662 is used to secure a terminal housing 626 to a recessed seat 632 formed in an outer surface 604 of a body 602 of a nozzle segment 600. The stress relief and fastener member 662 is secured to the nozzle body 602 using a set screw 656 and a hex bolt 664 that extend through respective openings 611, 613 into the nozzle body 602 with the terminal housing 626 sandwiched therebetween. The stress relief and fastener member 662 is a unitary piece of sheet metal stamped and bent in the shape and configuration shown. Thus, the member 662 has an elongated flat terminal housing retainer portion 615 and a curved stress relief portion 617 connected by a radially extending bridge 619 (see FIG. 16). The stress relief portion 617 includes a pair of arcuate (i.e. curved) retainers 621, 623 for retaining end portions of external insulated lead elements 620, 622 against a bottom wall 633 of the seat 632. This helps to provide stress relief at a terminal contained in a terminal housing 626.

It will be appreciated that numerous variations to the aforedescribed embodiments are possible and within the scope of the present invention. For example, injection molding nozzles or nozzle segments may have seats that are dimensioned so that at least 40%, 50%, 60%, 65%, 70%, 75%, 80%, 85%, 92%, 95%, 97%, 99% or 100% of the volume of the terminal housing is contained in the seat thereby reducing a radial size dimension of the nozzle or nozzle segment.

In the afore-described embodiments, the electrically conductive element consists of a resistance heater wire of a heater or a wire connected to thermocouple. However, it can also comprise a wire of a sensor for determining any other injection molding condition such as a pressure sensor or position sensor. The present invention is applicable to any terminal of an injection molding nozzle and is not restricted to terminals for heater elements or thermocouples.

The foregoing description has been provided by way of example only and shall not be construed to limit the scope of the invention as defined by the following claims. In these claims, for the sake of convenience, the term "nozzle" or "injection molding nozzle" shall be construed to mean the entire nozzle or any portion or segment thereof. Similarly, the term "nozzle body" shall be construed to mean the entire nozzle body or any portion or segment thereof.

The invention claimed is:

1. A hot runner injection molding nozzle comprising:
    a nozzle body having an outer surface, first and second opposed ends, and an inner surface defining a central melt channel extending between the first and second ends;
    an electrically conductive heating element coupled to the nozzle body and having at least one end coupled to an external lead element at a terminal connection; and
    a terminal housing containing the terminal connection and fastened to the nozzle body, wherein the outer surface of the nozzle body is recessed to define a seat and the terminal housing has a width that is at least partially positioned within the seat; and
    a stress relief member fastened to the nozzle body and adapted to retain the external lead element in a position spaced from the terminal connection thereby relieving stress on the terminal connection.

2. The nozzle of claim 1, wherein the seat and terminal housing are dimensioned so that at least 40% of the volume of the terminal housing is contained in the seat.

3. The nozzle of claim 1, wherein the seat and terminal housing are dimensioned so that 90% of the volume of the terminal housing is contained in the seat.

4. The nozzle of claim 1, wherein the electrically conductive heating element is an electrical resistance heater wire surrounded by insulation and embedded in the outer surface of the nozzle body.

5. The nozzle of claim 1, wherein the electrically conductive heating element extends into the seat.

6. The nozzle of claim 4, further comprising:
    a second external lead element, wherein the resistance heater wire has a portion formed into a U-shaped bend such that two opposite ends thereof are disposed at the terminal connection and each end is coupled to a respective external lead element.

7. The nozzle of claim 6, wherein end portions of the resistance heater wire extend in parallel into the seat such that the terminal connection is positioned within the seat.

8. The nozzle of claim 6, wherein the stress relief member is a part of the terminal housing and comprises a pair of protrusions extending from an interior surface of the terminal housing, the protrusions engaging the lead elements and clamping the lead elements against an opposite interior surface of the terminal housing.

9. The nozzle of claim 6, wherein the stress relief member is separate from the terminal housing and comprises a pair of arcuate retainers dimensioned to retain and clamp the respective lead elements against the outer surface of the nozzle body.

10. A nozzle body assembly for a hot runner injection molding nozzle, the assembly comprising:
    a nozzle body having an outer surface, first and second opposed ends, and an inner surface defining a central melt channel extending between the first and second ends, the nozzle body outer surface being recessed to define a seat, the seat having
        a bottom wall and
        at least three side walls radially-extending from the bottom wall comprising
            a pair of spaced side walls and
            a third wall connecting the spaced side walls, the third wall defining two openings;
    an electrically conductive heating element coupled to the outer surface of the nozzle body and extending into the seat in a direction that is generally parallel to the bottom wall of the seat, the electrically conductive heating element having two ends passing through respective openings in the third wall to be located in the seat; and
    two external lead elements, wherein each lead element is attached to a respective end of the electrically conductive heating element to form a terminal connection in the seat.

11. The assembly of claim 10, further comprising:
    a terminal housing at least partially positioned within the seat in the nozzle body, wherein the terminal housing surrounds the terminal connection.

12. The assembly of claim 11, wherein the seat and terminal housing are dimensioned so that at least 70% of the volume of the terminal housing is contained in the seat.

13. The assembly of claim 11, wherein the seat and terminal housing are dimensioned so that substantially all of the volume of the terminal housing is contained in the seat.

14. The assembly of claim 10, further comprising:
    a stress relief member attached to the nozzle body, wherein the stress relief member retains the external lead elements in a position against the nozzle body that is spaced from the terminal connection thereby relieving stress on the terminal connection.

15. A hot runner injection molding apparatus, comprising:
    a manifold having a manifold melt channel for receiving a melt stream of moldable material;
    a hot runner nozzle including,
        a nozzle body defining a central melt channel that is in fluid communication with the manifold melt channel, wherein an outer surface of the nozzle body is recessed to define a seat, the seat having a bottom wall and at least two side walls radially-extending from the bottom wall,
        an electrically conductive heating element coupled to the outer surface of the nozzle body and having an end portion that extends into the seat generally parallel with the bottom wall of the seat,
        an external lead element having an end portion that extends into the seat generally parallel with the bottom wall of the seat, wherein end portions of the heating element and the external lead element are electrically coupled to form a terminal connection within the seat, and
        a nozzle tip coupled to a downstream end of the nozzle body; and
    a mold cavity in fluid communication with the nozzle tip, wherein the mold cavity receives the melt stream of moldable material from the manifold via the hot runner nozzle.

16. The apparatus of claim 15, further comprising:
a terminal housing at least partially positioned within the seat in the nozzle body, wherein the terminal housing surrounds the terminal connection.

17. The apparatus of claim 15, further comprising:
a stress relief member attached to the nozzle body, wherein the stress relief member retains the external lead element in a position against the nozzle body that is spaced from the terminal connection thereby relieving stress on the terminal connection.

18. The apparatus of claim 15, wherein the at least two side walls of the seat include a pair of spaced side walls, and a third wall connecting the spaced side walls.

19. The apparatus of claim 18, wherein the third wall includes an opening through which the end portion of the electrically conductive heating element extends into the seat.

20. The apparatus of claim 15, further comprising:
a second external lead element having an end portion that extends into the seat generally parallel with the bottom wall of the seat, wherein the heating element has two end portions that are electrically coupled to respective end portions of the external lead elements within the seat to form the terminal connection.

* * * * *